US009715540B2

United States Patent
Deshmukh et al.

(10) Patent No.: US 9,715,540 B2
(45) Date of Patent: *Jul. 25, 2017

(54) USER DRIVEN AUDIO CONTENT NAVIGATION

(75) Inventors: Om D. Deshmukh, New Delhi (IN); Nitendra Rajput, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1469 days.

This patent is subject to a terminal disclaimer.

(21) Appl. No.: 12/822,802

(22) Filed: Jun. 24, 2010

(65) Prior Publication Data

US 2011/0320950 A1 Dec. 29, 2011

(51) Int. Cl.
| | | |
|---|---|---|
| G10L 15/00 | (2013.01) | |
| G10L 21/00 | (2013.01) | |
| H04M 3/00 | (2006.01) | |
| G06F 17/30 | (2006.01) | |
| G10L 21/043 | (2013.01) | |
| H04M 3/493 | (2006.01) | |

(52) U.S. Cl.
CPC .. *G06F 17/30775* (2013.01); *G06F 17/30743* (2013.01); *G10L 21/043* (2013.01); *G10L 15/00* (2013.01); *H04M 3/4938* (2013.01)

(58) Field of Classification Search
CPC ............. G10L 2015/00; G10L 2015/22; G10L 2015/221; G10L 2015/223; G10L 2015/225; H04M 1/274; H04M 3/7935; H04M 3/4938; H04M 2201/40
USPC ......... 704/9, 500, 201, 211, 270; 379/88.01, 379/88.04, 88.08
See application file for complete search history.

(56) References Cited

U.S. PATENT DOCUMENTS

| | | | | |
|---|---|---|---|---|
| 6,009,386 | A * | 12/1999 | Cruickshank et al. | 704/207 |
| 6,625,261 | B2 * | 9/2003 | Holtzberg | 379/88.23 |
| 6,775,358 | B1 * | 8/2004 | Breitenbach | H04M 3/4938 |
| | | | | 379/88.13 |
| 7,054,815 | B2 * | 5/2006 | Yamada et al. | 704/267 |
| 7,092,496 | B1 * | 8/2006 | Maes et al. | 379/88.01 |
| 7,313,525 | B1 * | 12/2007 | Packingham et al. | 704/270 |
| 7,729,478 | B1 * | 6/2010 | Coughlan et al. | 379/88.04 |
| 7,881,938 | B2 * | 2/2011 | Muschett | G10L 15/22 |
| | | | | 704/257 |
| 8,032,360 | B2 * | 10/2011 | Chen | G11B 20/00007 |
| | | | | 704/200 |

(Continued)

OTHER PUBLICATIONS

Hurst, Wolfgang et al, "An elastic audio slider for interactive speech skimming", ACM Multimedia, Conference Paper, Jan. 2004, 5 Pages, ResearchGate found at https://www.researchgate.net/directory/publications.

Arons, Barry, "SpeechSkimmer: A System for Interactively Skimming Recorded Speech", MIT Media Lab, ACM Transactions on Computer-Human Interaction, Mar. 1997, pp. 3-38, vol. 4, No. 1, ACM Digital Library.

(Continued)

*Primary Examiner* — Paras D Shah
(74) *Attorney, Agent, or Firm* — Ference & Associates LLC

(57) ABSTRACT

Systems and associated methods configured to provide user-driven audio content navigation for the spoken web are described. Embodiments allow users to skim audio for content that seems to be of relevance to the user, similar to visual skimming of standard web pages, and mark point of interest within the audio. Embodiments provide techniques for navigating audio content while interacting with information systems in a client-server environment, where the client device can be a simple, standard telephone.

15 Claims, 11 Drawing Sheets

(56) References Cited

U.S. PATENT DOCUMENTS

| | | | |
|---|---|---|---|
| 8,233,597 B2* | 7/2012 | Kerr et al. | 379/88.22 |
| 2002/0059073 A1* | 5/2002 | Zondervan | G06F 17/30905 704/270.1 |
| 2003/0088422 A1* | 5/2003 | Denenberg | G10L 15/28 704/275 |
| 2004/0015347 A1* | 1/2004 | Kikuchi | G09B 19/04 704/225 |
| 2004/0037401 A1* | 2/2004 | Dow et al. | 379/88.18 |
| 2005/0065797 A1* | 3/2005 | Haenel | H04M 3/4938 704/270.1 |
| 2006/0277052 A1* | 12/2006 | He | G10L 21/04 704/503 |
| 2007/0033032 A1* | 2/2007 | Schubert | G10L 15/22 704/235 |
| 2007/0038446 A1* | 2/2007 | Shen et al. | 704/235 |
| 2008/0152301 A1* | 6/2008 | Cho | H04N 5/783 386/343 |
| 2009/0047003 A1* | 2/2009 | Yamamoto | G11B 27/005 386/292 |
| 2011/0051911 A1* | 3/2011 | Agarwal | H04L 12/66 379/93.01 |
| 2011/0205149 A1* | 8/2011 | Tom | 345/156 |

OTHER PUBLICATIONS

Lemmetty, Sami, "Review of Speech Synthesis Technology", Master's Thesis, Helsinki University of Technology, Department of Electrical and Communications Engineering, Mar. 30, 1999, 113 pages, Helsinki University of Technology, Helsinki, Finland.

He, Liwei et al., "Exploring Benefits of Non-Linear Time Compression", Proceedings of the ninth ACM International conference on Multimedia, Ottawa, Canada, Sep. 30, 2001-Oct. 5, 2001, 11 pages, ACM, New York, New York, USA.

Hurst, Wolfgang et al., "Interactive Manipulation of Replay Speed While Listening to Speech Recordings", MM'04, Oct. 10-16, 2004, New York, New York, USA, 5 pages, ACM Digital Library.

Hurst, Wolfgang et al., "New methods for visual information seeking through video browsing", ACM Multimedia, Conference Paper, Aug. 2004, 7 pages, ResearchGate found at https://www.researchgate.net/directory/publications.

Ramos, Gonzalo et al., "Fluid Interaction Techniques for the Control and Annotation of Digital Video", UIST '03 Vancouver, BC, Canada, 10 pages, ACM Digital Library, 2003.

Racos, Salim et al., "High Quality Time-Scale Modification for Speech", Proceedings of IEEE ICASSP, 1985, 6 pages, IEEE Digital Library.

\* cited by examiner

Initialize ()
  current_speed ← normal_speed
  current_time ← $t_0$
  current_position ← $DM_0$
  current_audio ← name_$t_0$.wav ApplicationUpdateOrUserUpdate ()
  current_position ← $DM_i$
  current_audio ← name_$t_i$.wav
  current_time ← $t_i$ OnUserSpeedCommand ()
  cut_time ← current_speed/normal_speed*$(t_i - t_0)$ - $\delta$
  cut_file (current_audio, cut_time)
  current_speed ← normal_speed

FIG. 3B

OnPlaceMarkerCommand ()

cut_time ← current_speed/normal_speed*$(t_i - t_0)$ - $\delta$ cut_file (current_audio, cut_time)

place_marker (current_audio, cut_time, $DM_j$)

return_to_position ($DM_j$)

FIG. 6B

USER DRIVEN AUDIO CONTENT NAVIGATION

BACKGROUND

The subject matter described herein generally relates to systems and methods for audio content navigation.

Individuals are able to read a large amount of text information in a short time by skimming the textual content for interesting and/or relevant content. The textual content, such as displayed as part of a web page, is presented to the user. The human mind is able to skim through the textual content to identify key words and phrases from the sentence. For example, the text in large/bold fonts in the following line below is what may be used to identify whether the sentence is of importance to the reader:

"When I was walking in the garden yesterday, I saw a snake that passed very close to me."

Even without any such textual formatting, the human mind is able to catch the keywords and then identify whether the content can be skimmed through or should be read in detail.

Content creation and access in the developing world is mostly focused on audio content. There are various reasons for this, such as to account for low literacy rates among certain groups of users, to accommodate use of simple/standard devices (for example, voice-only phones), and the like. One clear example of this is the development of the World Wide Telecom Web (WWTW) (or alternately, the Spoken Web). The WWTW is a web of VoiceSites that contain information in audio, and can be accessed by a regular/standard phone.

BRIEF SUMMARY

Systems, methods, apparatuses and program products configured to provide user-driven audio content navigation are described. Embodiments allow users to skim audio for content that seems to be of relevance, similar to visual skimming of standard (text containing) web pages. Embodiments enable audio navigation/browsing such that navigation inputs provided by the user over a telephone/audio channel do not distort the continuity of the audio content. Embodiments additionally provide convenient markers, allowing a user to quickly navigate the audio. Embodiments therefore provide techniques for navigating audio content while interacting with information systems in a client-server environment, where the client device can be a simple, standard telephone.

In summary, one aspect provides a method comprising: receiving one or more audio browsing commands over a audio channel; responsive to the one or more audio browsing commands, saving an application state corresponding to a current point of user interaction with audio; and responsive to the one or more audio browsing commands, performing one or more of: generating a marker corresponding to a marked position in the audio; and re-synthesizing at least a portion of the audio to produce a portion of the audio having an altered playback speed according to the one or more audio browsing commands.

Another aspect provides a computer program product comprising: a computer readable storage medium having computer readable program code embodied therewith, the computer readable program code comprising: computer readable program code configured to, responsive to receiving one or more audio browsing commands over an audio channel, save an application state corresponding to a current point of user interaction with audio; and computer readable program code configured to, responsive to the one or more audio browsing commands, perform one or more of: generating a marker corresponding to a marked position in the audio; and re-synthesizing at least a portion of the audio to produce a portion of the audio having an altered playback speed according to the one or more audio browsing commands.

A further aspect provides a system comprising: one or more processors; and a memory operatively connected to the one or more processors; wherein, responsive to execution of computer readable program code accessible to the one or more processors, the one or more processors are configured to: responsive to one or more audio browsing commands received over an audio channel, save an application state corresponding to a current point of user interaction with audio; and responsive to the one or more audio browsing commands, perform one or more of: generating a marker corresponding to a marked position in the audio; and re-synthesizing at least a portion of the audio to produce a portion of the audio having an altered playback speed according to the one or more audio browsing commands.

A still further aspect provides a computer program product comprising: a computer readable storage medium having computer readable program code embodied therewith, the computer readable program code comprising: computer readable program code configured to, responsive to one or more audio browsing commands received over an audio channel, save an application state corresponding to a current point of user interaction with audio; computer readable program code configured to, responsive to receiving a marker command, generate a marker corresponding to a marked position in the audio; and computer readable program code configured to, responsive to a retrieve command, return to the marked position in the audio.

A yet further aspect provides a computer program product comprising: a computer readable storage medium having computer readable program code embodied therewith, the computer readable program code comprising: computer readable program code configured to, responsive to one or more audio browsing commands received over an audio channel, save an application state corresponding to a current point of user interaction with audio; and computer readable program code configured to, responsive to a speed up command, re-synthesize at least a portion of the audio to produce a portion of the audio having an altered playback speed according to the speed up command.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3B illustrates example speed control processing commands.

FIG. 6B illustrates example marker placement processing commands.

DETAILED DESCRIPTION

Figure 1:
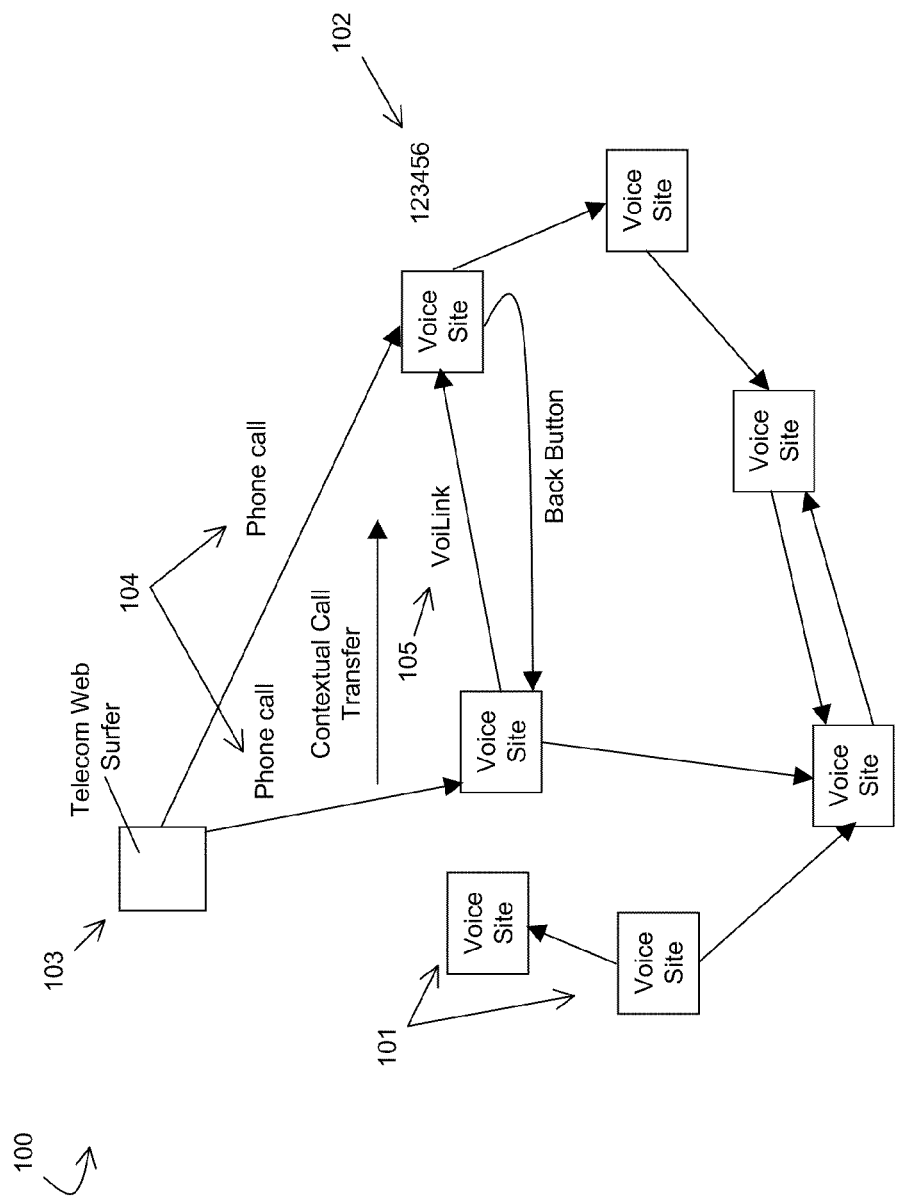
FIG. 1 illustrates an example view of the Spoken Web.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation. In this regard, the example embodiments described herein are discussed in the context of the World Wide Telecom Web (WWTW, also referred to throughout as the Spoken Web); however, embodiments are equally applicable to other use contexts where audio navigation is desirable.

As described herein, while textual content is easily skimmed or can be easily modified (for example, by providing emphasis formatting), a growing trend in the developing world is creation and utilization of VoiceSites, which are comprised of audio content. As this development continues, it is increasingly desirable to provide users with enhanced abilities to navigate through audio content that they listen to over the phone. Speech, however, is slow to listen to and difficult to skim when compared to text. Moreover, the sequential inputs provided over the telephone/audio channel break the current control flow of the voice application, making convenient return to portions of the audio difficult to manage.

Embodiments thus provide techniques that enable users to navigate audio easily using commands issued via a standard (for example, voice-only) telephone over a telephony channel (audio channel). Embodiments broadly provide techniques by which the users are able to skim through audio content in a fast manner, and are able to reduce the speed of the audio when they realize that the content is of importance to them. Embodiments utilize saved application state information to facilitate orderly non-uniform processing of (re-synthesizing) portions of the audio file for faster playback. Moreover, embodiments can utilize saved application state information to facilitate placement of markers for convenient audio navigation. That is, even given the transitory nature of audio application state and the sequentially input navigation commands, embodiments provide a mechanism to mark and go back (return) to the audio content that is of importance to the user. Embodiments thus provide the necessary techniques enabling enhanced audio navigation to users having access to only simplified client devices (such as voice-only phones).

The description now turns to the figures. The illustrated example embodiments will be best understood by reference to the figures. The following description is intended only by way of example and simply illustrates certain selected example embodiments representative of the invention, as claimed.

First, a short contextual description of the WWTW is provided in order to formulate the problems addressed by embodiments and highlight some shortcomings of related work in this domain.

Referring to FIG. 1 and using the Spoken Web 100 as a non-limiting use context, VoiceSites 101 (the reference numeral 101 is used to refer to VoiceSites generally, both singular and plural) are voice-driven applications that are hosted in the telecom network. VoiceSites 101 are addressed by a unique phone number 102 and can be accessed from any phone instrument 103 (mobile or landline) through an ordinary phone call 104 to a given VoiceSite 101 number. Thus, accessing a VoiceSite 101 does not require any extra software to be installed on the client device 103 (phone). VoiceSites 101 are therefore analogous to web sites of the World Wide Web (WWW), but can be accessed by dialing a phone number 102 using a phone 103 rather than entering a URL into a web browser of a computing device, and information can be heard rather than being seen/read.

Creation of a VoiceSite 101 is made easy by systems such as the VoiGen system (described in detail elsewhere), to which anyone can call and interact with through voice. Such a system enables any person that can communicate using speech to create his/her own VoiceSite 101. Such a system also enables easy local audio-content creation. A VoiceSite 101 can link 105 to other VoiceSites 101 through Hyperspeech Transfer Protocol (HSTP). Such interconnected VoiceSites 101 result in a network called referred to as the WWTW or the Spoken Web 100.

The focus of this description is example embodiments enabling access to and navigation of audio content using standard phones in a manner better than is currently available, through user-driven audio navigation techniques. Other content-driven intelligent navigation techniques such as collaborative filtering and audio classification are not specifically addressed herein. Moreover, audio navigation techniques designed for use in connecting with higher-end computing devices (such as a desktop personal computers, smart phones, and the like) are generally inapplicable to scenarios described herein, where the user is limited to a standard phone as the client device, such as is common in many places throughout the world.

Example embodiments will first be discussed with regard to skimming techniques. The inventors have recognized that while skimming of audio has been studied in detail in, conventional techniques fall short in several respects. The simplest methods employ a linear increase in the speed of the audio to a certain level (at some point, the human mind cannot comprehend the audio because it is playing too fast).

Beyond this, non-linear techniques are used to skim the audio by removing pauses, noise and inflections (such as "uh" and "umm").

However, the conventional skimming techniques described in the literature are in a mode where the device that has the control of speed and the audio are the same, such as for example a desktop computer, smart phone or the like. When the audio is accessed in the WWTW, the standard phone acts as the controlling client device and the processing and the audio content storage are handled in a remote server (hosting the VoiceSite). The client as used herein can be a simple, standard phone instrument (such as a voice-only phone), as contrasted with a high-end device (like a personal computer or a smart phone). The server is a Spoken Web system and the audio channel links the server and the client, as in FIG. 1.

Thus, how to enable efficient audio navigation of the audio content in a client-server mode is a challenging problem addressed by embodiments. Embodiments employ speed control processing techniques enabling a user to choose from different speeds in the audio for skimming.

Figure 2A:
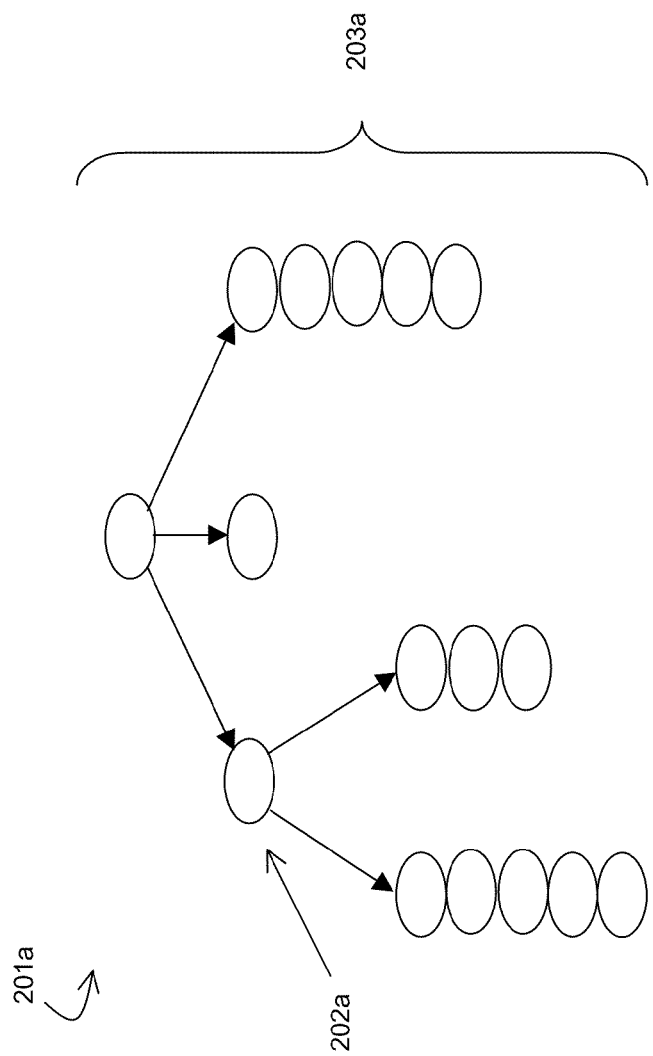
FIG. 2A illustrates an example VoiceSite structure.
Figure 2B:
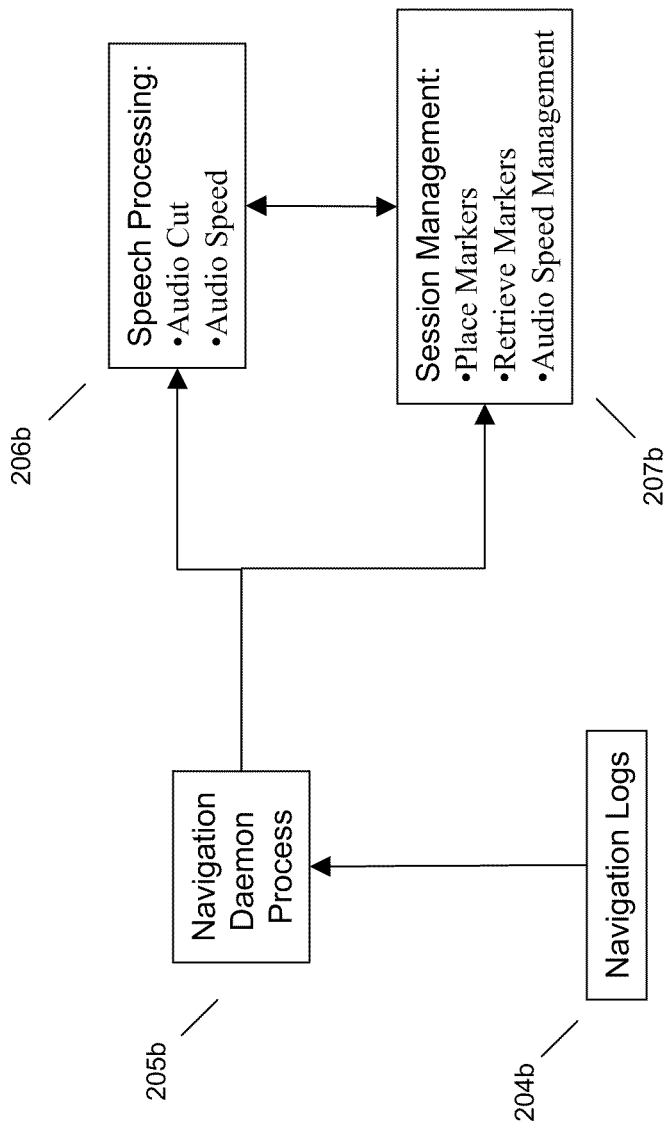
FIG. 2B illustrates an example of speech processing and session management.

Referring to FIG. 2A-B, the VoiceSite 201a is commonly configured as a tree structure 203a. Users use keypad or speech inputs to navigate to different nodes 202a in the tree 203a. Each node 202a contains audio content in the form of an audio file. When a user navigates this audio, logs 204b are generated on the server hosting the VoiceSite 201a. These logs 204b enable the server to identify the node 202a in the tree 203a, and the specific time that a user has spent in the audio on that node 202a. Values from these logs 204b are used in the speed control processing described herein.

At a VoiceSite, when the user presses any navigation/browsing command, a daemon process 205b detects this as input, conducts speech processing 206b by identifying the current audio, and doing an audio cut to generate the new audio according to the browsing command (with the new speed and/or the new start point). The daemon process 205b also performs navigation session management 207b by bookkeeping the current speed and the markers, if they are placed (described further herein).

Figure 3A:
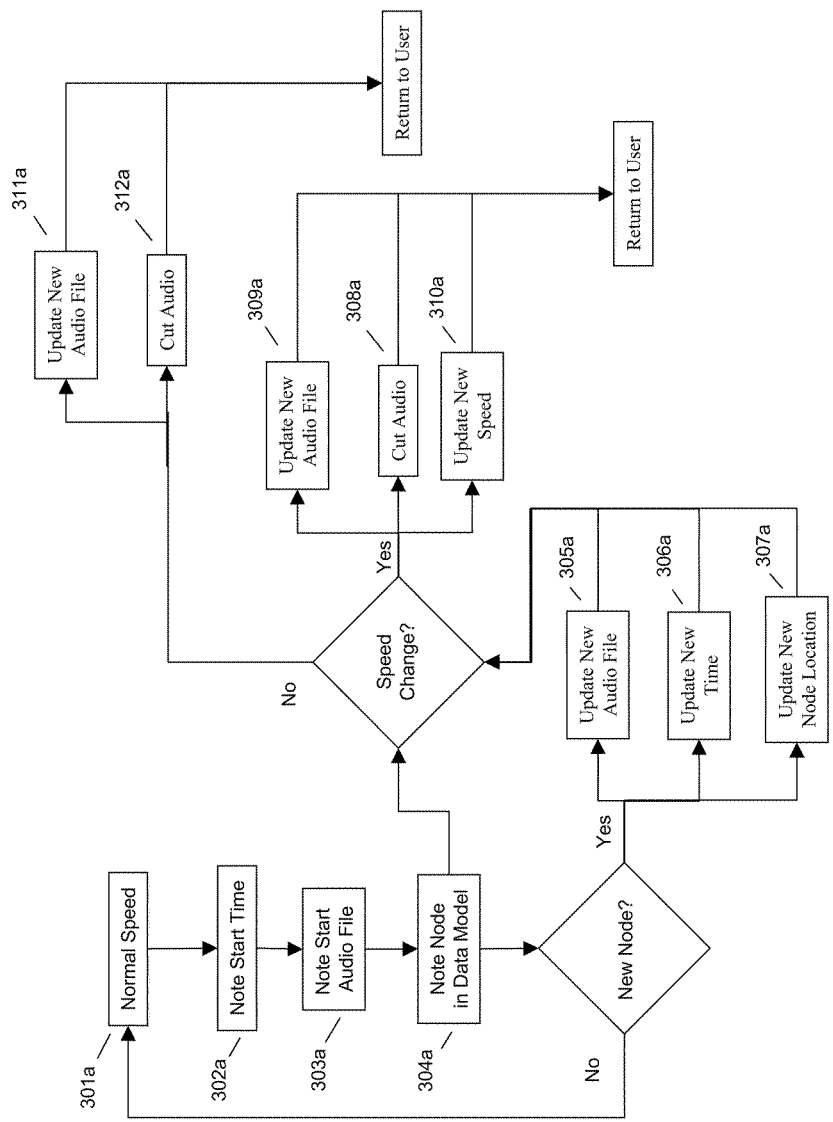
FIG. 3A illustrates an example speed control process.

A speed control process according to embodiments works on the basis of events, analysis and presentation, and is illustrated generally in FIG. 3A. Specific example commands are illustrated in FIG. 3B. In the context of a speed change request, the user events trigger the navigation commands, the analysis of the events enable generation of the new audio file, and the presentation takes the user to the location where he or she was browsing, with the new speed.

Referring to FIG. 3A, when a call starts, the system initializes to the normal speed 301a, notes the start time 302a, and the starting audio file 303a that is played to the user at the root node. The system also notes the node in the data model 304a. When a user issues a command (such as a speed control command), the system saves application state information corresponding to the current user interaction at the time of user interrupt. The application state information saved is useful for returning to the user audio corresponding to audio heard at the current user interaction (at the time of interrupt), as further described herein.

Responsive to navigation to a new node, either through progression of the voice application or by a specific user command, the new audio file 305a, time 306a and the node location 307a are updated. Similarly, application state information is saved corresponding to this user interaction.

When a navigation command to change the speed is issued by the user (the example command shown in connection with FIG. 3B is OnUserSpeedCommand( )), the OnUserNavigationCommand( ) is called by the Navigation Daemon process 205b mentioned in FIG. 2B. The current audio (304a or 305a) is then cut 308a until the point that the user has already listened to it ($t_1-t_0$). This is assigned to the cut_time. An additional $\delta$ time is subtracted from the audio so that there remains some overlap from where the user initiated the (speed change) command and where the new speed version starts. This time is based on the substantial pause that is detected before the interrupt location in the audio. This is done to ensure continuity from the user perspective.

A new (altered) file 309a with the user requested speed 310a is generated and presented to the user, with the speed updated to the one that is provided by the user. In an example implementation, three levels of audio speed are available for selection: normal, 25% time compressed, and 35% time compressed.

If a new speed is not selected, the audio speed is not altered but the audio is cut 312a and the new audio file 311a is returned to the user. This amounts to returning audio to the user corresponding to the audio at the time of user interrupt, similar to the speed processing steps discussed above (without the need to update the speed). This would correspond for example to a scenario where the user has interrupted the audio presentation by inputting a command, but wishes to return to the audio file at the place of interrupt (entry of command).

In terms of how speech can be processed (re-synthesized or altered) in order to make it faster, embodiments utilize a technique to drop speech frames in a non-uniform fashion. As discussed herein, simply speeding up all speech in an audio file in a linear, uniform manner is not desirable, as the speech becomes unintelligible once a certain speed is achieved. Previous work introduced a technique for speeding up speech in a uniform way, referred to as pitch synchronous overlap and add (PSOLA). PSOLA essentially estimates pitch in voiced regions of audio, identifies pitch-related peaks in the signal, drops pitch-synchronous frames uniformly, and re-synthesizes the rest of the signal. In some other work, a short amount of speech containing audio, on the order of several seconds, is played to increase the overall speed of "listening through" the entire audio. The short amount of speech containing audio is selected as following a long pause (used to infer a new topic has been reached) or following a pitch-based emphasized region. In contrast, embodiments employ a non-uniform drop of steady speech frames from audio for compressing (and thus speeding up) speech.

Figure 4A:
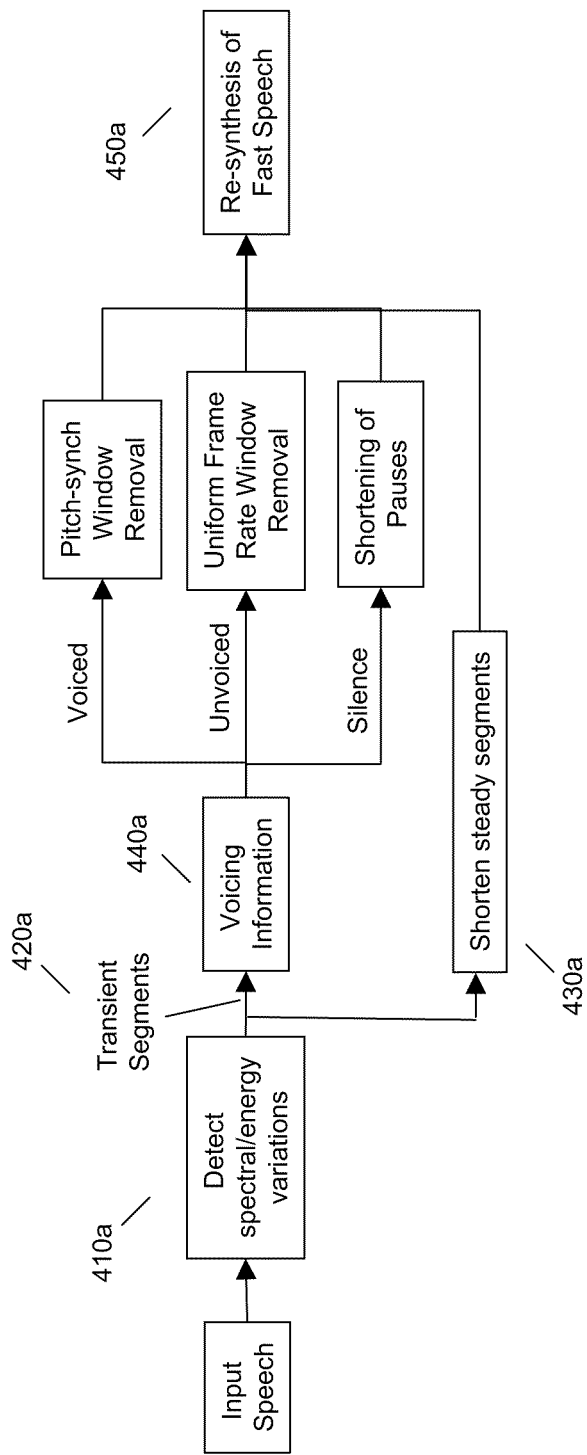
FIG. 4A illustrates an example of voice signal processing for speed control.

FIG. 4A illustrates an example of non-uniform speech processing. As shown, input speech is first analyzed to detect 410a spectral/energy variations. The transient segments (regions) 420a are separated from steady segments (regions) based on energy, where energy of transient segments 420a is higher and variable as compared with that of steady segments.

The steady segments are shortened 430a, as it is assumed that they are not important for perceiving the meaning of the speech contained within the signal. The transient segments 420a are further analyzed 440a to identify voicing information such that they can be shortened as well, though to a lesser extent compared to the shortened steady segments. As illustrated in FIG. 4A, transient segments 420a may contain voiced, unvoiced and silence regions. For voiced regions, pitch-synch window removal can be applied. For unvoiced regions, uniform frame rate window removal can be applied. For silence, shortening of pauses can be applied.

Figure 4B:
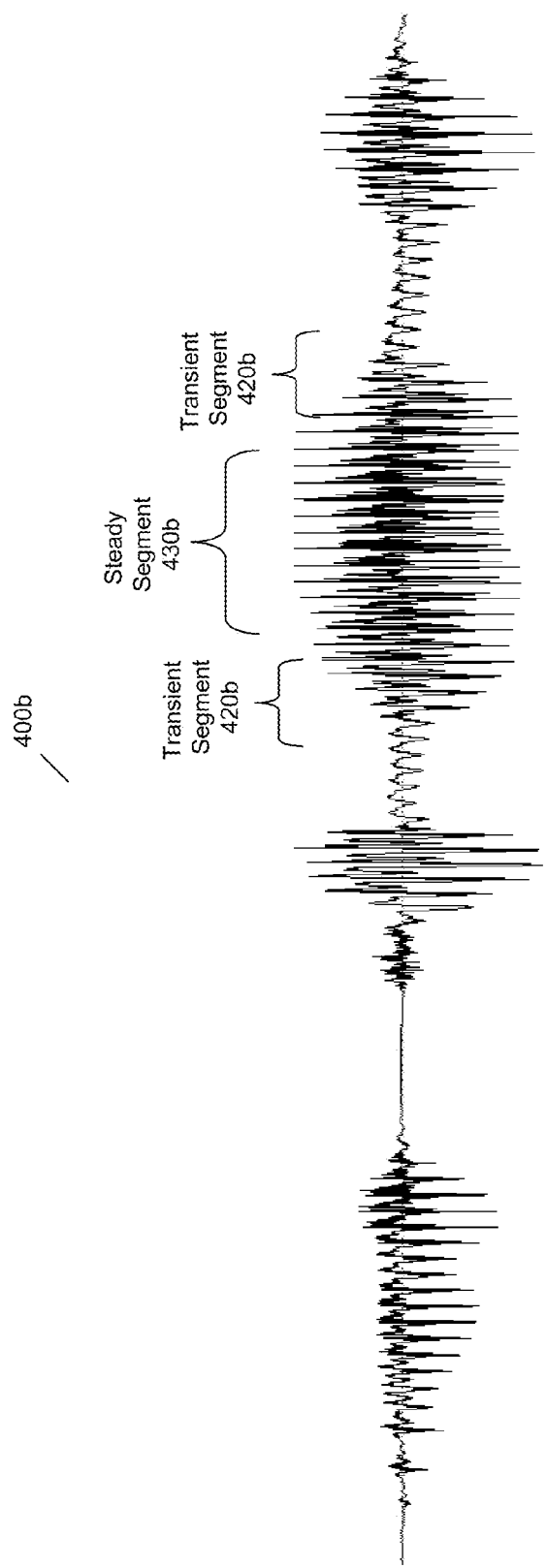
FIG. 4B illustrates an example voice signal as well as transient and steady segments thereof.

FIG. 4B illustrates an example voice signal 400b containing transient segments 420b and steady segments 430b. Transient segments 420b can be identified for example via analyzing the spectral and/or energy characteristics of short segments (on the order of several milliseconds) via any of a variety of mechanisms, for example using the standard Mel-frequency cepstral coefficients (MFCC) spectral mechanism. The formula below characterizes this mechanism:

$$C_i = \frac{1}{\|\underline{M_i}\|} \sum_{j=i-\frac{N}{2}}^{i+\frac{N}{2}} \|\underline{M_j} - \mu_i\|$$

$$\mu_i = \frac{1}{N+1} \sum_{j=i-\frac{N}{2}}^{i+\frac{N}{2}} \|\underline{M_j} - \mu_i\|$$

where $\underline{M_i}$ is the MFCC vector of frame i, $\mu_i$ is the mean of MFCC vectors over N frames adjacent to the $i^{th}$ frame, and $\|\underline{M_j}\|$ is the Euclidean norm. $C_i$ values above a threshold imply significant spectral variation and can be used to identify transient segments 420b. For energy variation, the differences in amplitudes in adjacent frames can be computed. Differences in energy values above a threshold imply significant energy variation and can likewise be used to identify transient segments 420b. Once transient segments 420b have been identified, frames from the steady segments 430b (that is, non-transient segments) can either be dropped from the re-synthesized audio entirely or can be sped up at a faster rate than the frames from the transient segments 420b.

As described herein, transient segments 420b can have a variety of techniques applied for to achieve speed up. For voiced regions, the frame rate is pitch-synchronous and frame length is an integer multiple of the local pitch value. For unvoiced regions, the frame rate is constant and the frame length is an integer multiple of the frame rate. One example approach is to simply drop the unvoiced regions of the audio. The voiced regions may or may not be sped up, depending on the desired speed of speech playback in the re-synthesized audio. Silent regions of audio are either completely dropped or shortened based on the target speed factor (as for example indicated by the user).

The above mentioned modifications are done in such a way that the overall prosody of the sentence/speech utterance is maintained. To accomplish this, important portions (prosody regions) of the audio for maintaining prosody are identified. First, regions that the speaker intended to stress/emphasize are identified. These regions can be identified by using syllable-stress recognition techniques which employ syllable-level acoustic features such as pitch, duration, energy and so on. Depending on the target speed, these regions of emphasis can be sped up at a smaller rate as compared to the regions in the non-emphasized regions (again using the non-uniform frame dropping method in both the regions), or be left unmodified. The prosody of the entire utterance is thus maintained even as it is sped up. Prosody can be maintained by maintaining the contours of pitch, energy and formants, among other things. The prosody plays a role in identifying the tone of the speaker (anger/question/surprise), gender/age of the speaker and other similar extra-linguistic details about the utterance that can assist in better understanding the message. Accordingly, preserving the prosody is desirable in most cases.

Figure 5:
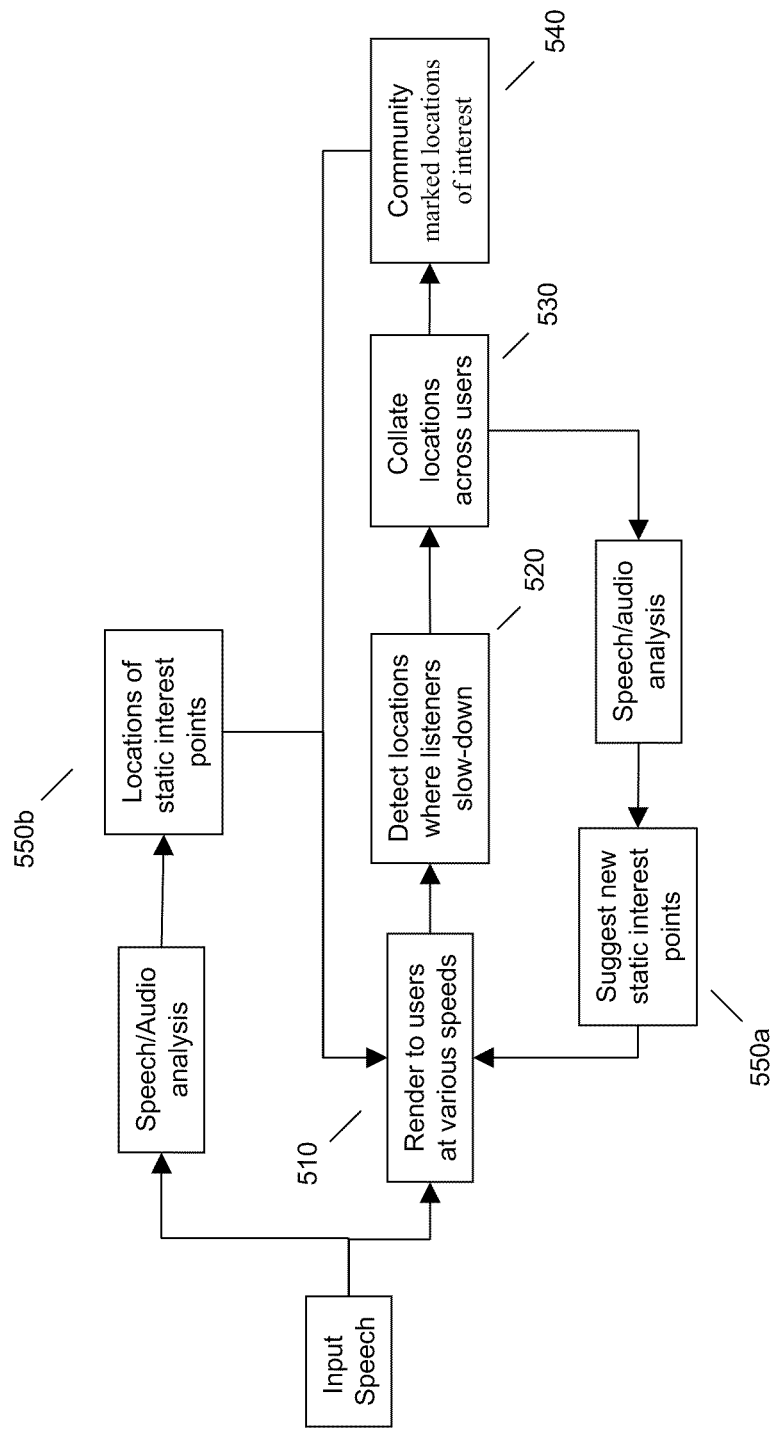
FIG. 5 illustrates an example processing for learning which audio file portions to subject to speed control processes.

Referring to FIG. 5, an example technique for adaptive learning of important segments of audio is illustrated, such as for further use in speech speed up. For example, the system can track inputs by users to learn over time which audio segments are considered particularly interesting. For example, input speech can be rendered 510 to the users at various speeds. The system can detect 520 user inputs indicating at which point in the audio users choose to slow down. The system can store and collate 530 this data across the users of the system to determine 540 community-marked locations of interest in the audio.

Moreover, the system can suggest 550a, 550b new static interest points within the audio to users based in part on an analysis of the locations indicated by the users or based upon an independent analysis of the audio, respectively. The (independent) speech and audio analysis can include for example analysis of the speech to identify a set of pre-defined points of interest (such as clapping, commotion, a new speaker, multi-speaker talk, musical interruptions, and the like). Thus, interest points represent state changes in the audio. A spectro-temporal analysis can be utilized to detect such interest points. This can be useful for example for summarizing a longer audio segment with a shorter audio segment or for suggesting go-to points in the audio signal. Such an audio summary of the longer audio segment may be useful to newer callers wishing to obtain summary audio information quickly.

Example embodiments employing marker placement techniques are now described. It should be understood that the speed control techniques could be included in embodiments employing the marker placement techniques, and vice versa.

As described herein, given the sequential nature of user input browser commands, embodiments are configured to retain certain information (application state) when a user interrupts the audio playback, for example to switch to another portion of audio or to select altered playback speed for audio. This facilitates ease of navigation, as the system can use this information to enable a user to return to previous point in an audio file, re-synthesize the portion(s) of the audio file for altered playback, and the like. The application state(s) saved are similar for the speed control processing and marker placement, with a difference being that the system also saves the new speed in the speed control case, whereas the system saves the marker location and number in the marker case.

Figure 6A:
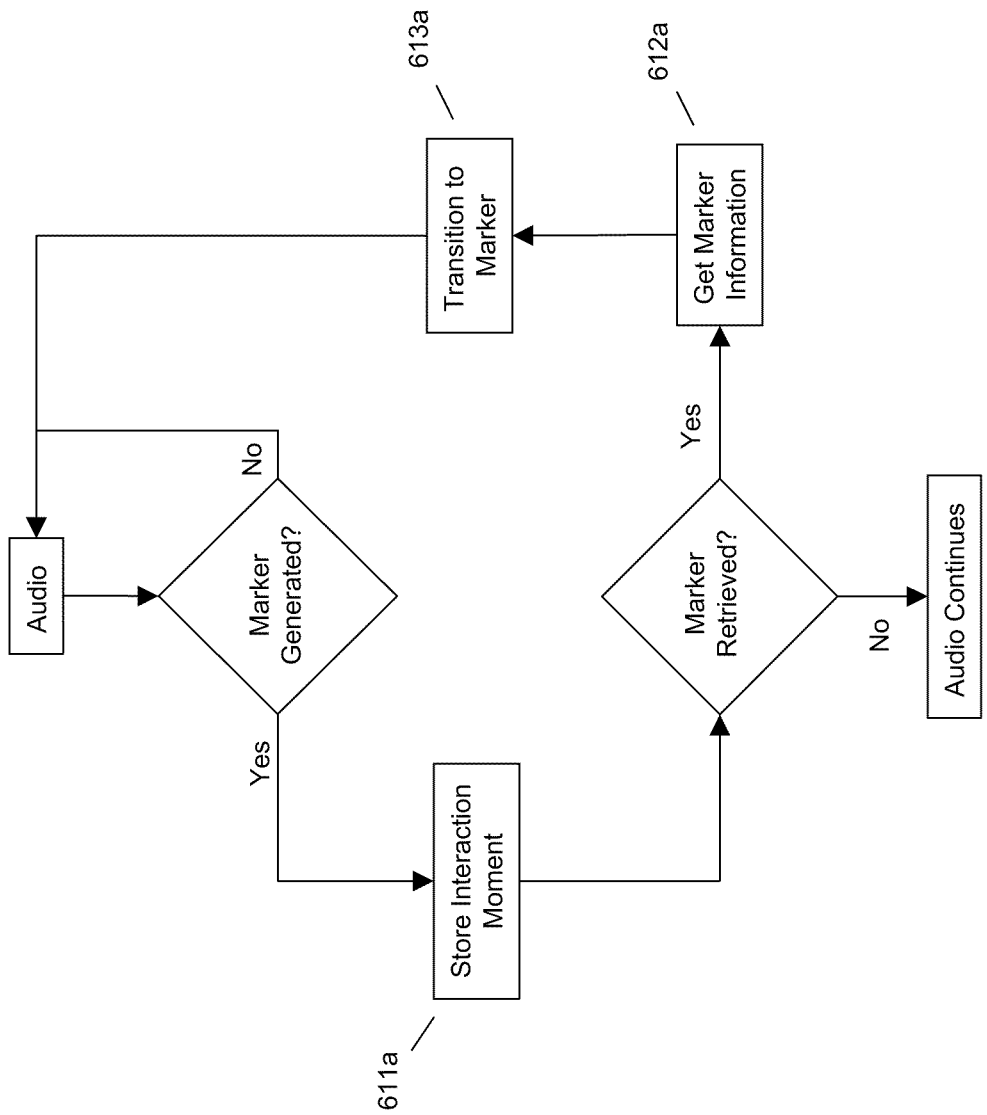
FIG. 6A illustrates an example marker placement process.

An example marker placement and return process is illustrated generally in FIG. 6A. Specific example commands are illustrated in FIG. 6B. Embodiments utilize a marker process that works on the principles of store, continue and retrieve. This permits the user to utilize a sequential audio session over the audio channel (in terms of both sequential user input and sequential processing) for transitioning between portions of the audio, in addition to the speeding up techniques discussed herein. The markers described herein provide logic for saving application state information (for example, current audio session information such as location in the audio file at time of interrupt) of the user's current interaction such that the user can conveniently return to a marked position.

When a marker is generated by the user, the system stores 611a the current interaction moment (as for example through place_marker( ) command of FIG. 6B). The system includes in the marker application state information such as the current audio, the cut time, and the current node location.

The system can thus take the user back to where he or she was (as for example through return_to_position( ) command illustrated in FIG. 6B) (at the marker).

When a marker is retrieved 612*a*, the stored marking information is retrieved and the user is transferred 613*a* to that location. The process works similar to the speed control process discussed herein (for the initialization and application update commands and processing), again with a difference being the speed processing specific steps. Thus, when a marker is retrieved 612*a* by the user, the values that were stored earlier 611*a* are retrieved and the user control is transferred to the specific node in the tree, to the specific location in that audio 613*a*, as determined by the cut_time which was calculated at the time of placement of the marker (again, similar to the speed control process).

These two processes (speed control and marking) ensure that the user controls at the client side are processed at the server, while the user interaction at the client is still continuous in nature. Thus, embodiments permit users having only standard phones and/or users that are limited to speech only interactions with the system to easily navigate the audio content of the Spoken Web.

Figure 7:
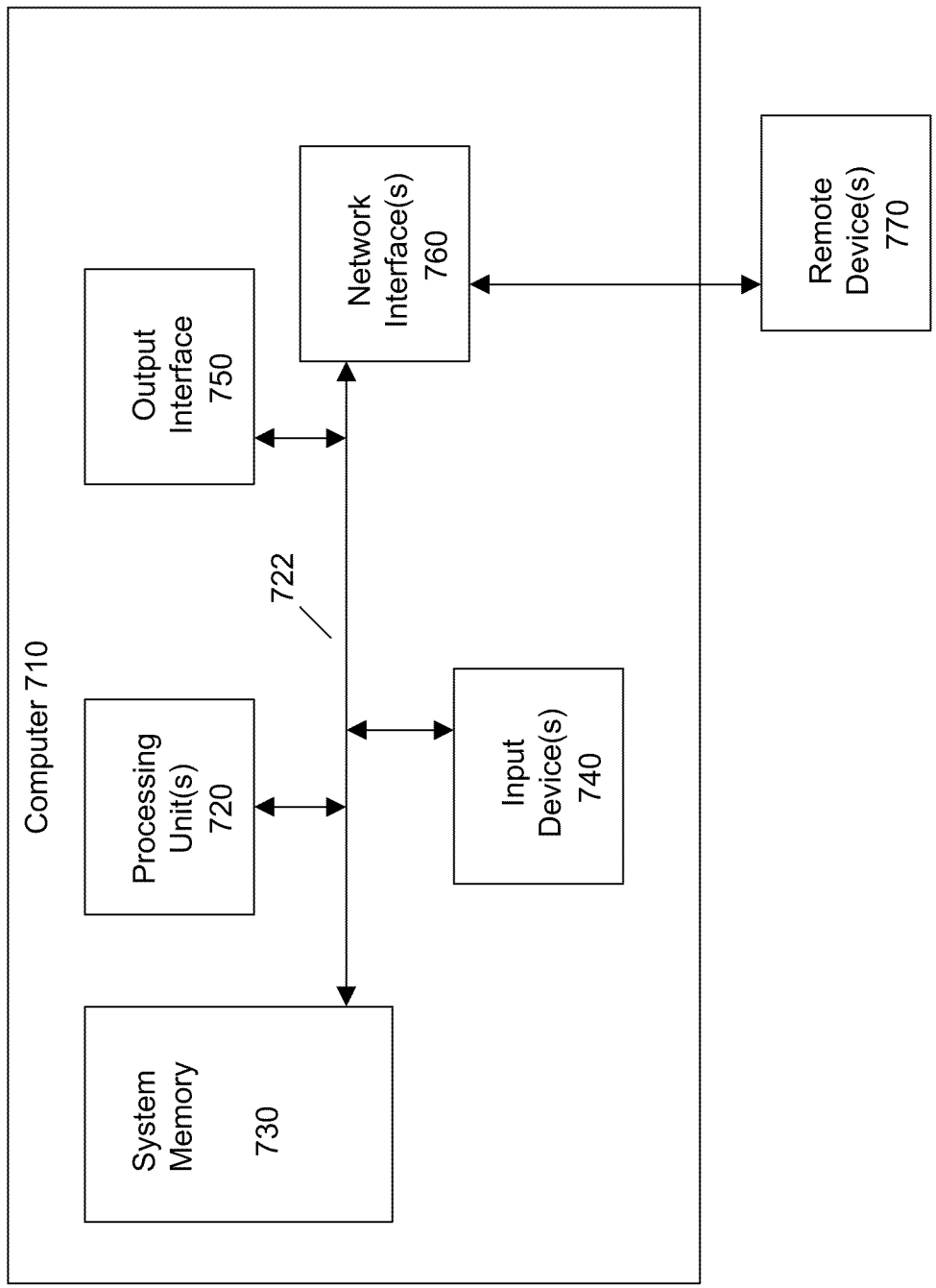
FIG. 7 illustrates an example computer system.

Referring to FIG. 7, it will be readily understood that certain embodiments can be implemented using any of a wide variety of devices or combinations of devices. An example device that may be used in implementing one or more embodiments includes a computing device in the form of a computer 710, such as a server hosting a VoiceSite. In this regard, the computer 710 may execute program instructions configured to provide audio data of a VoiceSite, receive and respond to input browsing commands from a user such as speed and marker commands, as discussed herein, and perform other functionality of the embodiments, as described herein.

Components of computer 710 may include, but are not limited to, a processing unit 720, a system memory 730, and a system bus 722 that couples various system components including the system memory 730 to the processing unit 720. The computer 710 may include or have access to a variety of computer readable media. The system memory 730 may include computer readable storage media in the form of volatile and/or nonvolatile memory such as read only memory (ROM) and/or random access memory (RAM). By way of example, and not limitation, system memory 730 may also include an operating system, application programs, other program modules, and program data.

A user can interface with (for example, enter commands and information) the computer 710 through input devices 740. A monitor or other type of device can also be connected to the system bus 722 via an interface, such as an output interface 750. In addition to a monitor, computers may also include other peripheral output devices. The computer 710 may operate in a networked or distributed environment using logical connections to one or more other remote computers or databases. The logical connections may include a network, such local area network (LAN) or a wide area network (WAN), but may also include other networks/buses, including audio channel connections to other devices.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider, or the connection may be made for example to a client device (such as a standard telephone) via a audio channel connection.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In brief recapitulation, herein are presented embodiments broadly providing audio navigation techniques that can be used to navigate a large amount of audio content over the phone. Results gathered using an example implementation suggest adoption of such techniques can be very useful for accessing information over the phone.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A computer program product comprising:
   a non-transitory computer readable storage medium having computer readable program code embodied therewith, the computer readable program code comprising:
   computer readable program code configured to receive, at a voice-driven application hosted on a telecom network, one or more audio browsing commands, wherein the one or more audio browsing commands comprises a change in audio speed command;
   computer readable program code configured to, responsive to the receiving one or more audio browsing commands, save an application state corresponding to a current point of user interaction with audio contained at a node of the voice-driven application;
   computer readable program code configured to cut the audio until the current point of user interaction associated with the receipt of the one or more audio browsing commands;
   computer readable program code configured to generate a marker corresponding to the cut position in the audio;
   computer readable program code configured to subtract an additional time from the audio from the current point of user interaction;
   computer readable program code configured to re-synthesize the audio to produce a portion of the audio having an altered playback speed according to the one or more audio browsing commands, wherein the re-synthesized audio comprises audio having an overlap between a time where the receipt of the one or more audio browsing commands was received and where the speed change starts based upon the additional time subtracted from the audio; and
   storing a marker location and number corresponding to the generated marker along with the speed change associated with the audio seed command.

2. The computer program product according to claim 1, wherein the one or more audio browsing commands includes a retrieve command.

3. The computer program product according to claim 2, further comprising computer readable program code configured to, responsive to the retrieve command, returning to the marked position in the audio.

4. The computer program product according to claim 3, wherein the marked position in the audio is offset to accommodate delay in generating the marker.

5. The computer program product according to claim 1, further comprising computer readable program code configured to use the application state to return audio beginning a point corresponding to user interaction with the audio at a time the one or more audio browsing commands were received.

6. The computer program product according to claim 1, wherein the one or more audio browsing commands includes a speed up command.

7. The computer program product according to claim 6, further comprising computer readable program code configured to, responsive to the speed up command, re-synthesize at least a portion of the audio to produce a portion of the audio having increased playback speed.

8. The computer program product according to claim 7, wherein to re-synthesize at least a portion of the audio to produce a portion of the audio having increased playback speed further comprises performing non-uniform dropping of frames within the audio.

9. The computer program product according to claim 8, wherein performing non-uniform dropping of frames within the audio further comprises one or more of:
   identifying one or more steady regions and one or more transient regions within the audio, wherein said transient regions are maintained; and
   identifying prosody regions within the audio to be retained for maintaining prosody, wherein said prosody regions are maintained within the audio.

10. A computer program product comprising:
    one or more processors; and
    a memory operatively connected to the one or more processors;
    wherein, responsive to execution of computer readable program code accessible to the one or more processors, the one or more processors are configured to:
    receive, at a voice-driven application hosted on a telecom network, one or more audio browsing commands, wherein the one or more audio browsing commands comprises a change in audio speed command;
    responsive to the receiving one or more audio browsing commands, save an application state corresponding to a current point of user interaction with audio contained at a node of the voice-driven application;

cut the audio until the current point of user interaction associated with the receipt of the one or more audio browsing commands;

generate a marker corresponding to the cut position in the audio;

subtract an additional time from the audio from the current point of user interaction;

re-synthesize the audio to produce a portion of the audio having an altered playback speed according to the one or more audio browsing commands, wherein the re-synthesized audio comprises audio having an overlap between a time where the receipt of the one or more audio browsing commands was received and where the speed change starts based upon the additional time subtracted from the audio; and store a marker location and number corresponding to the generated marker along with the speed change associated with the audio speed command.

11. The system according to claim 10, wherein the one or more audio browsing commands includes one or more of:
a retrieve command for returning to the marked position in the audio; and
a speed up command for re-synthesized speech having an increased playback speed.

12. A computer program product comprising:
a non-transitory computer readable storage medium having computer readable program code embodied therewith, the computer readable program code comprising:
computer readable program code configured to receive, at a voice-driven application hosted on a telecom network, one or more audio browsing commands, wherein the one or more audio browsing commands comprises a change in audio speed command;
computer readable program code configured to, responsive to the receiving one or more audio browsing commands, save an application state corresponding to a current point of user interaction with audio contained at a node of the voice-driven application;
computer readable program code configured to cut the audio until the current point of user interaction associated with the receipt of the one or more audio browsing commands;
computer readable program code configured to, responsive to receiving a cut command, generate a marker corresponding to the cut position in the audio;
computer readable program code configured to subtract time from the audio from the current point of user interaction; and
computer readable program code configured to return to the marked position in the audio and re-synthesize the audio to produce a portion of the audio having an altered playback speed according to the one or more audio browsing commands, wherein the re-synthesized audio comprises audio having an overlap between the marked position and the re-synthesized audio having an altered playback speed based upon the time subtracted from the audio.

13. The computer program product according to claim 12, further comprising computer readable program code configured to, responsive to generating the marker command, return to a position of the audio according to the saved an application state.

14. The computer program product according to claim 12, wherein the marked position in the audio is offset to accommodate delay in generating the marker.

15. The computer program product according to claim 14, wherein to re-synthesize at least a portion of the audio further comprises performing non-uniform dropping of frames within the audio.

* * * * *